United States Patent
Yui et al.

(10) Patent No.: US 10,035,693 B2
(45) Date of Patent: Jul. 31, 2018

(54) DEVICES FOR PREVENTING THE FORMATION OF BIOLFILMS IN BOTTLED WATER DISPENSERS

(71) Applicants: George Yui, Toronto (CA); Andrei Yui, Toronto (CA)

(72) Inventors: George Yui, Toronto (CA); Andrei Yui, Toronto (CA)

( * ) Notice: Subject to any disclaimer, the term of this patent is extended or adjusted under 35 U.S.C. 154(b) by 257 days.

(21) Appl. No.: 14/857,532

(22) Filed: Sep. 17, 2015

(65) Prior Publication Data

US 2017/0081164 A1   Mar. 23, 2017

(51) Int. Cl.
| | |
|---|---|
| *B01F 3/04* | (2006.01) |
| *B67D 1/00* | (2006.01) |
| *B67D 1/07* | (2006.01) |
| *B67D 1/08* | (2006.01) |
| *B67D 1/10* | (2006.01) |
| *B67D 1/12* | (2006.01) |
| *B67D 3/00* | (2006.01) |
| *C02F 1/78* | (2006.01) |

(52) U.S. Cl.
CPC ............ *B67D 1/07* (2013.01); *B01F 3/04241* (2013.01); *B01F 3/04262* (2013.01); *B01F 3/04808* (2013.01); *B67D 1/0009* (2013.01); *B67D 1/0857* (2013.01); *B67D 1/0859* (2013.01); *B67D 1/0878* (2013.01); *B67D 1/10* (2013.01); *B67D 1/1247* (2013.01); *B67D 3/0038* (2013.01); *C02F 1/78* (2013.01); *B01F 2003/0439* (2013.01); *B01F 2003/04886* (2013.01); *B01F 2215/0052* (2013.01); *B67D 2001/0812* (2013.01); *B67D 2210/00023* (2013.01); *B67D 2210/00031* (2013.01); *B67D 2210/00097* (2013.01); *C02F 2201/782* (2013.01); *C02F 2303/20* (2013.01); *C02F 2307/10* (2013.01)

(58) Field of Classification Search
CPC .............. B01F 3/04808; B01F 3/04262; B01F 3/04241; B01F 2003/04886; B01F 2003/0439; B01F 2215/0052; C02F 1/78; C02F 2201/782; C02F 2303/20; C02F 2307/10; B67D 1/0009; B67D 1/07; B67D 1/0857; B67D 1/0878; B67D 1/10; B67D 1/1247; B67D 3/0038; B67D 2210/00097; B67D 2210/00031; B67D 2210/00023; B67D 2001/0812
See application file for complete search history.

(56) References Cited

U.S. PATENT DOCUMENTS

| | | | |
|---|---|---|---|
| 2012/0055885 A1* | 3/2012 | Davis | C02F 1/78 210/760 |
| 2012/0189502 A1* | 7/2012 | Yui | B67D 1/0857 422/168 |

* cited by examiner

*Primary Examiner* — Lucas Stelling

(57) ABSTRACT

A bottled water dispenser is disclosed that includes a water bottle, a cold tank, and an ozone generator, which is fluidly coupled to a Y-connector. The dispenser includes a first tube that is fluidly coupled to a first port of the Y-connector, with the first tube being configured to deliver ozone gas to the cold tank. The dispenser further includes a second tube that is fluidly coupled to a second port of the Y-connector, with the second tube being configured to deliver ozone gas to the water bottle. The ozone gas is effective to sterilize and prevent biofilm formation within the interior areas of the cold tank and water bottle. The dispensers further include an in-line flow restrictor positioned in-line with either the first tube or second tube, which helps balance the flow of ozone that is delivered to the cold tank and water bottle.

9 Claims, 4 Drawing Sheets

DEVICES FOR PREVENTING THE FORMATION OF BIOLFILMS IN BOTTLED WATER DISPENSERS

FIELD OF THE INVENTION

The present invention relates generally to the field of bottled water dispensers and, more particularly, to devices and methods for sterilizing bottled water dispensers and preventing biofilm formation within such dispensers.

BACKGROUND OF THE INVENTION

The demand for clean and healthy drinking water is increasing dramatically. The rapid growth in population, and standards of living, across the globe are fueling an incredible demand for devices and methods that enable drinking water, and the containers which hold and dispense drinking water, to be efficiently and safely sterilized. There are certain devices that have been developed which employ the use of ozone gas ($O_3$) to sterilize such dispensers (and the water contained therein), such as those described in U.S. Pat. No. 8,153,074 to G. Yui (which is incorporated herein by reference).

However, there are certain prior art devices that suffer from one or more drawbacks. For example, many of the currently-available devices are unable to prevent the growth of bacteria that colonize in the areas of above the water levels within both a cold tank of the dispenser and the water bottle itself (i.e., many of the currently-available devices are only able to sterilize the actual water, but not other internal parts of both the cold tank and water bottle). Moreover, such prior art devices are often unable to prevent biofilm formation on the various surfaces within the cold tank and water bottle (such biofilms can further exacerbate the problems caused by bacterial growth, by providing protection to the contaminating bacteria).

The internal areas of a water dispenser are often heavily prone to bacterial colonization (particularly when the dispensers include a hot tank for preparing and storing hot water). Indeed, the often warm and humid environment that exists on the interior surfaces of such water dispensers is ideal for bacterial growth. Currently-available water dispensers are often unable to effectively maintain such areas in a sterile condition. In addition, it has been found that some currently-available sterilization methods leave unsafe levels of residual ozone in the drinking water, which can impart an undesirable taste to the drinking water (and, furthermore, can be hazardous to a person's health).

As the following will demonstrate, many of the foregoing problems with currently-available sterilization devices and methods for water dispensers are addressed by the present invention.

SUMMARY OF THE INVENTION

According to certain aspects of the invention, a bottled water dispenser is provided that includes a water bottle, a cold tank, and an ozone generator. The bottled water dispenser may also, optionally, include a hot water tank (for heating, storing, and dispensing hot water). In certain embodiments, the invention provides that the ozone generator is fluidly coupled to a Y-connector, which includes a first port and a second port. The dispenser includes a first tube that is fluidly coupled to the first port of the Y-connector, with the first tube being configured to deliver ozone gas from the ozone generator to the cold tank. The dispenser further includes a second tube that is fluidly coupled to the second port of the Y-connector, with the second tube being configured to deliver ozone gas from the ozone generator to the water bottle. The invention provides, however, that in certain alternative embodiments, the ozone generator may be configured to provide ozone gas to either the cold tank or water bottle (and not both). The invention provides that the ozone gas is effective to sterilize and prevent biofilm formation within the interior areas of the cold tank and/or water bottle.

In certain preferred embodiments, the dispensers further include a flow-restricting capillary tube that is positioned in-line with either the first tube or second tube, which helps balance the flow of ozone that is delivered to the cold tank and water bottle. More particularly, the invention provides that the flow-restricting capillary tube is positioned in-line with (a) the first tube, if the first tube is shorter than the second tube; or (b) the second tube, if the second tube is shorter than the first tube. In addition, the invention provides that the flow-restricting capillary tube may be configured to be adjustable, such that the capillary tube may be adjusted to modulate the amount of flow resistance that is imparted by the flow-restricting capillary tube. This way, the capillary tube may be adjusted, as necessary, to achieve a balanced (or a substantially balanced) flow of ozone gas to the cold tank and water bottle. When the ozone generator is configured to provide ozone gas to either the cold tank or water bottle (and not both), the flow-restricting capillary tube is not required.

The invention provides that the first tube may terminate above the volume of water in the cold tank and, similarly, the second tube may terminate above the volume of water in the water bottle. In such embodiments, a water level sensor will preferably be positioned within the cold tank that is configured to communicate water level information to a control board of the dispenser. The invention provides that the control board is configured to (a) activate and deactivate a water pump that extracts and delivers water from the water bottle to the cold tank and (b) maintain a water level within the cold tank below a point at which the first tube terminates and deposits ozone gas therein. This feature prevents water from exiting the cold tank through the first tube, which may otherwise damage the ozone generator.

In other embodiments, the first tube may terminate within the volume of water in the cold tank (e.g., near a floor of the cold tank, below the water level) and, similarly, the second tube may terminate within the volume of water in the water bottle (e.g., near a floor of the water bottle, below the water level). In such embodiments, the first tube and second tube will each preferably include an ozone diffuser located at a terminal end of each such tube. The ozone diffuser may be comprised of porous stone, porous sintered metal, or other suitable materials. In the embodiments described above, the invention provides that the ozone generator is configured to dispense ozone gas into the cold tank and water bottle at defined time intervals, in amounts that are effective to sterilize and prevent biofilm formation within the interior areas of the cold tank and water bottle (but are yet safe and comply with applicable laws and regulations).

The above-mentioned and additional features of the present invention are further illustrated in the Detailed Description contained herein.

DETAILED DESCRIPTION OF THE INVENTION

Figure 1:
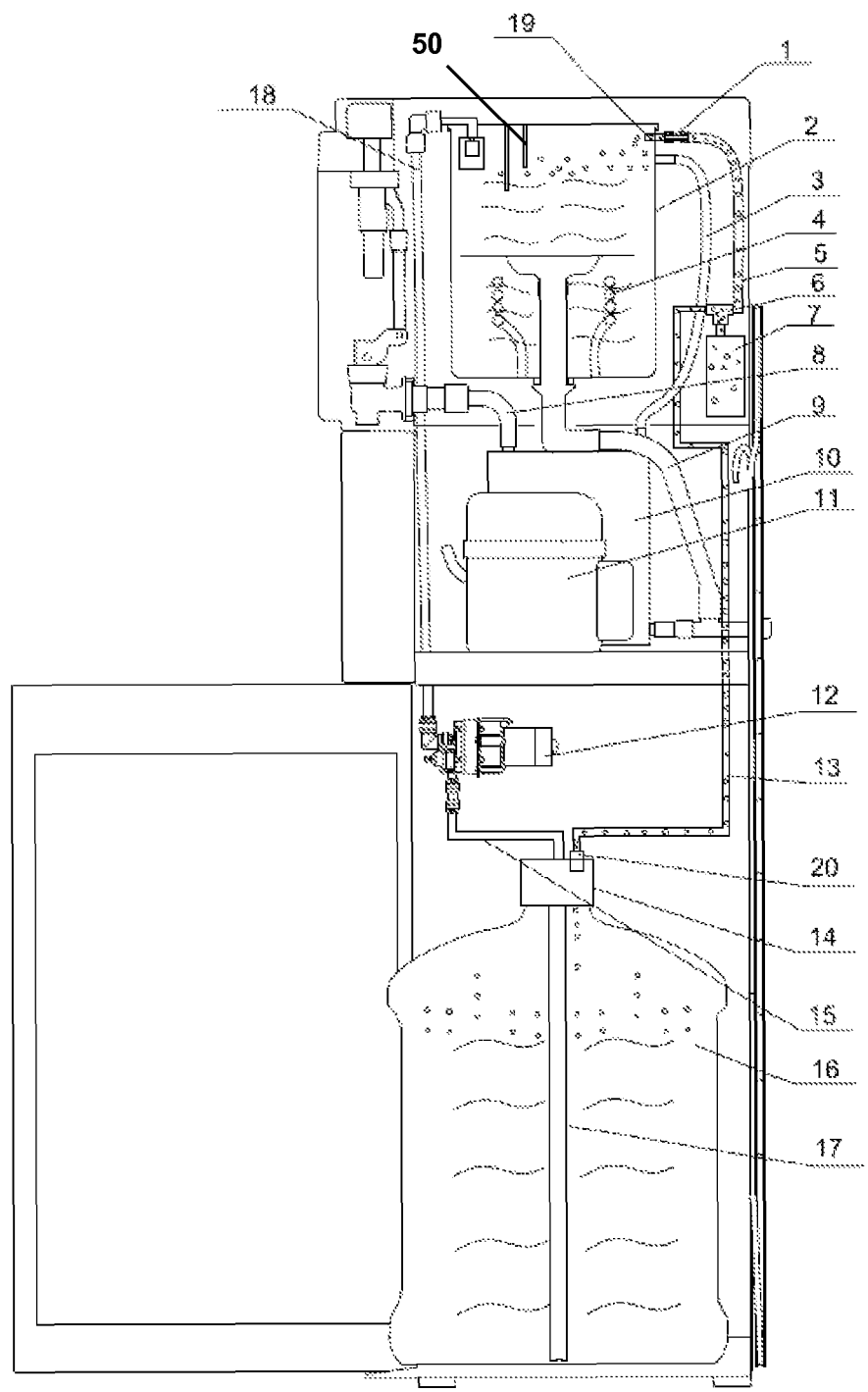
FIG. 1: A cross-sectional, side view of an exemplary water dispenser of the present invention, which employs the devices and methods for sterilizing the interior surfaces of the cold tank and water bottle described herein (and is configured to deposit ozone gas above the water levels in the cold tank and water bottle).

The following will describe in detail several preferred embodiments of the present invention. These embodiments are provided by way of explanation only, and thus, should not unduly restrict the scope of the invention. In fact, those of ordinary skill in the art will appreciate upon reading the present specification and viewing the present drawings that the invention teaches many variations and modifications, and that numerous variations of the invention may be employed, used and made without departing from the scope and spirit of the invention.

Referring to FIGS. 1-4, according to certain embodiments of the present invention, a bottled water dispenser is provided that includes a cabinet that houses a water bottle 16 (e.g., a replaceable 5-gallon water bottle), a cold tank 2, and a series of fluidly coupled tubes 17,15,18 that are configured to extract and deliver water from the water bottle 16 to the cold tank 2. The invention provides that a pump 12 is positioned in-line with such tubes, which provides the necessary force to extract and deliver water from the water bottle 16 to the cold tank 2. The cold tank 2 will preferably comprise a means for cooling or chilling the water contained therein, such as by incorporating the use of heat sinks (evaporators) or circulating coolants (refrigerant gasses) through a series of cooling coils 4 that may reside within (or on the exterior surface of) the cold tank 2, with the circulating force being provided by a compressor 11.

In addition, in certain embodiments, the water dispensers may include a hot tank 10, which includes one or more heating elements to heat the water contained therein. The hot tank 10 will be fluidly coupled to, and will receive water from, the cold tank 2 through a dedicated tube 9. The invention provides that the dispensers will further include a tube that is fluidly coupled to the cold tank 2 (and, if applicable, a tube 8 that is fluidly coupled to the hot tank 10) through which water will travel to exit the dispenser through one or more exterior faucets (when a user wishes to dispense drinking water). For those dispensers that include a hot tank 10, a tube 3 may fluidly connect the hot tank 10 and cold tank 2 through which steam (and pressure) inside the hot tank 10 is allowed to escape that recirculate back into the cold tank 2.

According to certain preferred embodiments, the bottled water dispensers of the present invention further include an ozone generator 7, which is fluidly coupled to the cold tank 2 and water bottle 16. More particularly, the ozone generator 7 is fluidly coupled to a Y-connector 6. The Y-connector 6 includes two ports, with a first port connected to a tube 5 that is configured to deliver ozone gas to the cold tank 2 and a second port connected to a tube 13 that is configured to deliver ozone gas to the water bottle 16. In certain embodiments, and referring to FIGS. 1 and 2, the invention provides that tube 5 is configured to end/terminate (through an air tight seal fitting 19) above the water level in the cold tank 2, such that ozone gas is deposited within the cold tank 2 above the water level. Similarly, in such embodiments, tube 13 is configured to end/terminate (through an air tight seal fitting 20 within the neck 14 of the water bottle 16) above the water level in the water bottle 16. In such embodiments, the ozone gas is deposited above the water levels in both the cold tank 2 and water bottle 16 (and allowed to make direct and immediate contact with the internal surfaces of such components that are most prone to bacterial growth). The invention provides, however, that in certain alternative embodiments, the ozone generator 7 may be configured to provide ozone gas to either the cold tank 2 or water bottle 16 (and not both).

Figure 3:
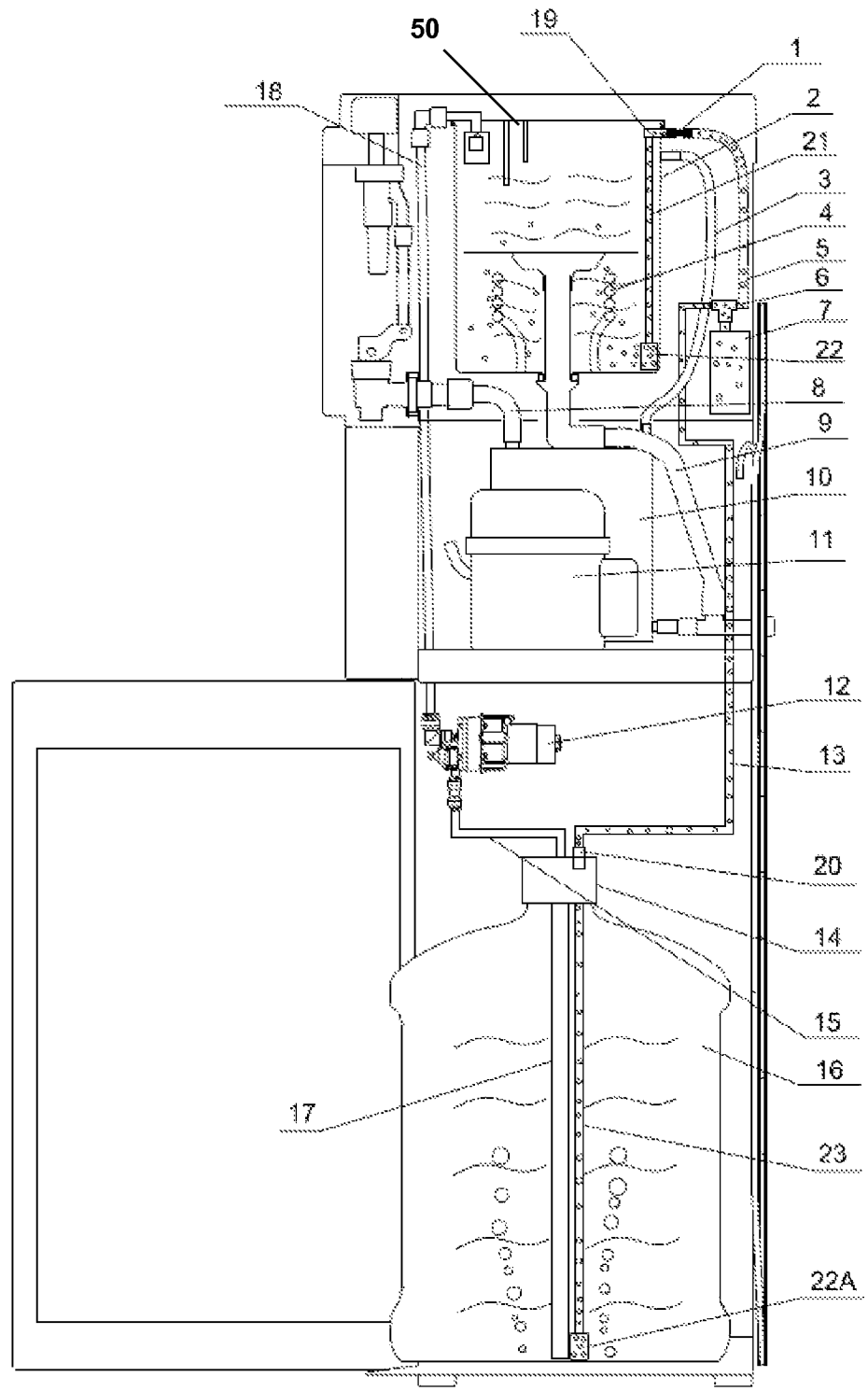
FIG. 3: A cross-sectional, side view of another exemplary water dispenser of the present invention, which employs the devices and methods for sterilizing the interior surfaces of the cold tank and water bottle described herein (and is configured to deposit ozone gas below the water levels in the cold tank and water bottle).
Figure 4:
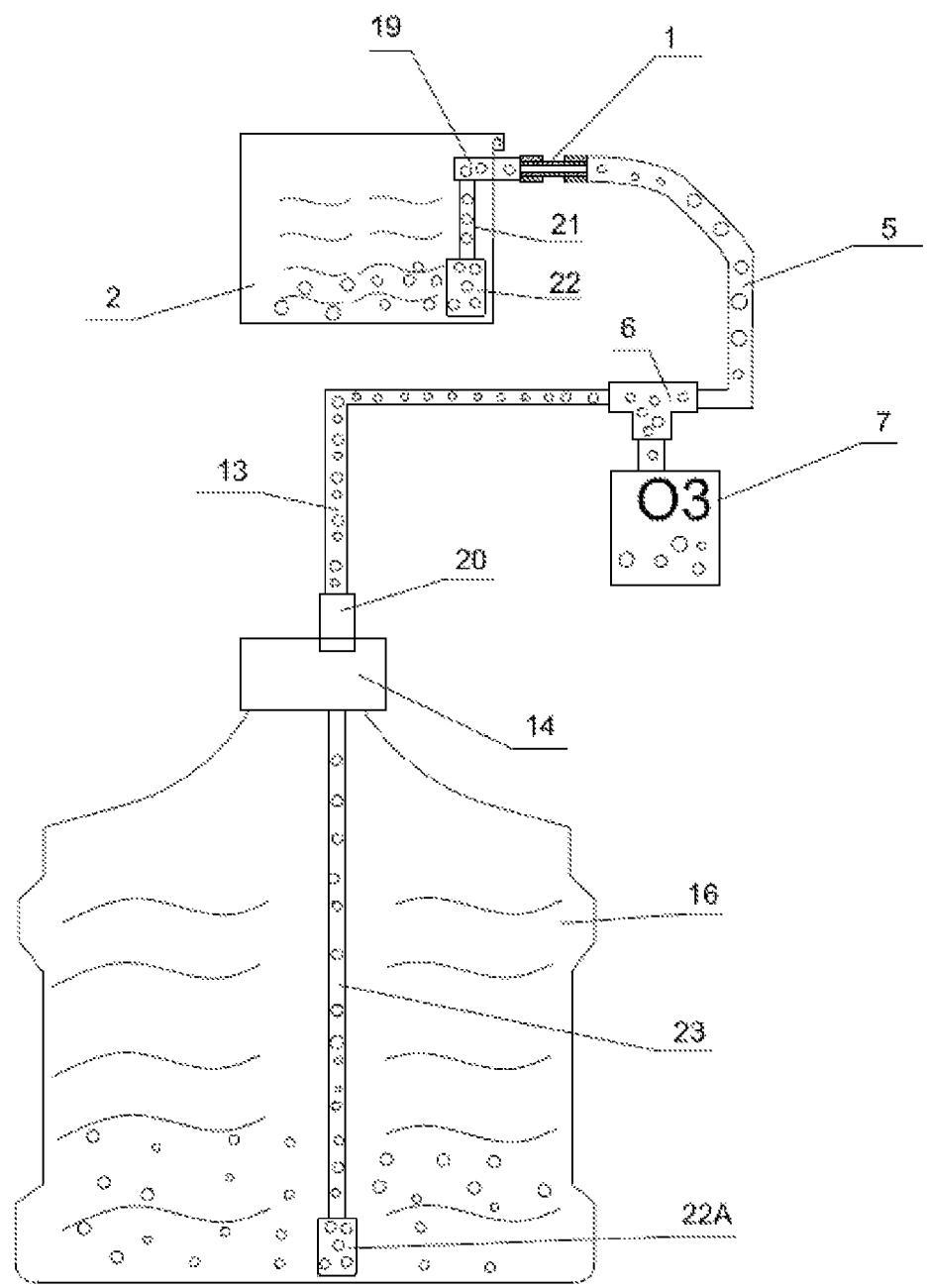
FIG. 4: A cross-sectional, side view of the ozone generator, Y-connector, capillary tube, cold tank, and water bottle shown in the water dispenser of FIG. 3.

According to further alternative embodiments, and referring to FIGS. 3 and 4, the invention provides that tube 5 may be configured to be fluidly coupled (through an air tight seal fitting 19) to a connecting tube 21, with the connecting tube 21 ending/terminating below the water level in the cold tank 2. Similarly, in such embodiments, tube 13 is configured to be fluidly coupled (through an air tight seal fitting 20 within the neck 14 of the water bottle 16) to a connecting tube 23 that ends/terminates below the water level in the water bottle 16. In these embodiments, the invention provides that the connecting tube 21 and connecting tube 23 will preferably (but optionally) comprise a porous diffuser 22,22A at the terminal end of each tube. The invention provides that the ozone diffuser 22,22A may be comprised of porous stone, sintered metal, or other appropriate materials.

The invention provides that the differences in length between the tube(s) 5,21 that deliver ozone gas to the cold tank 2 and the tube(s) 13,23 that deliver ozone gas to the water bottle 16 can result in undesirable differences in the amount of ozone gas delivered to each of the cold tank 2 and water bottle 16. For example, if tube(s) 5,21 that deliver ozone gas to the cold tank 2 are shorter than tube(s) 13,23, such differences in tube length (and pressure within such tubes) may result in excessive amounts of ozone gas being delivered to the cold tank 2—and insufficient amounts of ozone gas being delivered to the water bottle 16. In certain preferred embodiments, the invention provides that the tube(s) that exhibit the shortest collective distance from the ozone generator 7 to its end point (i.e., either the cold tank 2 or water bottle 16) will preferably include an in-line flow restrictor (to balance the flow of ozone gas between the two end points). The invention provides that the in-line flow restrictor may exhibit any of several different forms, such as (i) a tube having a smaller diameter (to restrict flow) relative to the other/longer tube; (ii) a valve that can shut down or hinder the flow of ozone gas; (iii) vent regulators that can shut down or hinder the flow of ozone gas; (iv) a flow-restricting capillary tube (as discussed further below); or (v) other mechanical means for restricting the flow of ozone gas through a tube.

More particularly, for example, in certain preferred embodiments, tube 5 is configured with an in-line, flow-restricting capillary tube 1. The invention provides that the capillary tube 1 will include an internal area (through which ozone gas will travel) that is smaller than its preceding tube 5. That is, the diameter of the capillary tube 1 will be smaller than the diameter of tube 5, such that the flow of ozone gas through the capillary tube 1 is more restricted relative to the flow of ozone gas through tube 5. This configuration will slow down the flow of ozone gas to the cold tank 2, which preferably aligns and balances such flow of ozone gas with that of the water bottle 16. In certain embodiments, the invention provides that the capillary tube 1 may be adjusted by a user of the water dispensers, e.g., by modulating the length and/or internal diameter of the capillary tube 1, a user can deliver more-or-less restriction to the flow of ozone gas through the capillary tube 1.

As mentioned above, the invention provides that an in-line flow restrictor, e.g. the flow-restricting capillary tube 1 described herein, is preferably positioned in-line with the tube(s) that exhibit the shortest collective distance from the ozone generator 7 to its end point (i.e., either the cold tank 2 or water bottle 16). In other words, for the embodiments shown in FIGS. 1 and 2, the flow-restricting capillary tube 1 will be positioned in-line with the shorter of tube 5 or tube 13. Similarly, for the embodiments shown in FIGS. 3 and 4, the flow-restricting capillary tube 1 will be positioned in-line with the shorter of (a) the aggregate distance covered by tube 5 and tube 21 or (b) the aggregate distance covered by tube 13 and tube 23. The invention provides that when the ozone generator 7 is configured to provide ozone gas to either the cold tank 2 or water bottle 16 (and not both), an in-line flow restrictor (e.g., a flow-restricting capillary tube 1) will not be required.

The invention provides that the ozone generator 7 is configured to produce ozone gas ($O_3$) at a concentration that is effective to kill, or substantially reduce the viable number of, bacteria and/or other microbes within the cold tank 2 and water bottle 16. A non-limiting concentration of such ozone gas ($O_3$) may range between 20-50 PPB. The invention provides that the ozone gas output may be modulated through the ozone generator 7 using devices and techniques well-known in the art, either by the end user (or by the manufacturer of the water dispenser).

The invention provides that the ozone gas, once dispensed into the cold tank 2 and water bottle 16, will break down over time. Accordingly, in order to avoid bacterial growth on a continuous basis, the ozone generator 7 may comprise a programmable regulator which may be configured to dispense ozone into the cold tank 2 and water bottle 16 at defined time points (and in defined amounts). For example, by way of illustration and not limitation, the ozone generator 7 may be operably connected to a control board within the dispenser, which can be configured and programmed to instruct the ozone generator 7 to release ozone gas into the cold tank 2 and water bottle 16 for a specific duration of time and at defined time points, e.g., ozone may be dispensed for 4 seconds every 2 hours, for 4 seconds every 4 hours, for 6 seconds every 4 hours, or any other variation desired by the manufacturer of the dispenser. According to such embodiments, only minimal and safe levels of ozone gas are dispensed into the cold tank 2 and water bottle 16, in order to ensure that the sterilized water is safe to drink, and will not exhibit an undesirable taste.

In certain preferred embodiments, the air tight seal fittings 19,20 may further comprise a filter or sponge, which may be used to trap, capture, neutralize, and/or destroy any ozone gas that may otherwise be released from the interior of the cold tank 2 and water bottle 16, either during periods of non-use or when water is dispensed therefrom (to avoid the release of ozone gas into the surrounding air). The filter or sponge may be comprised of any material, or combination of materials, which is capable of sequestering, neutralizing, or destroying ozone gas. A non-limiting example of such materials is foam saturated with activated carbon.

Figure 2:
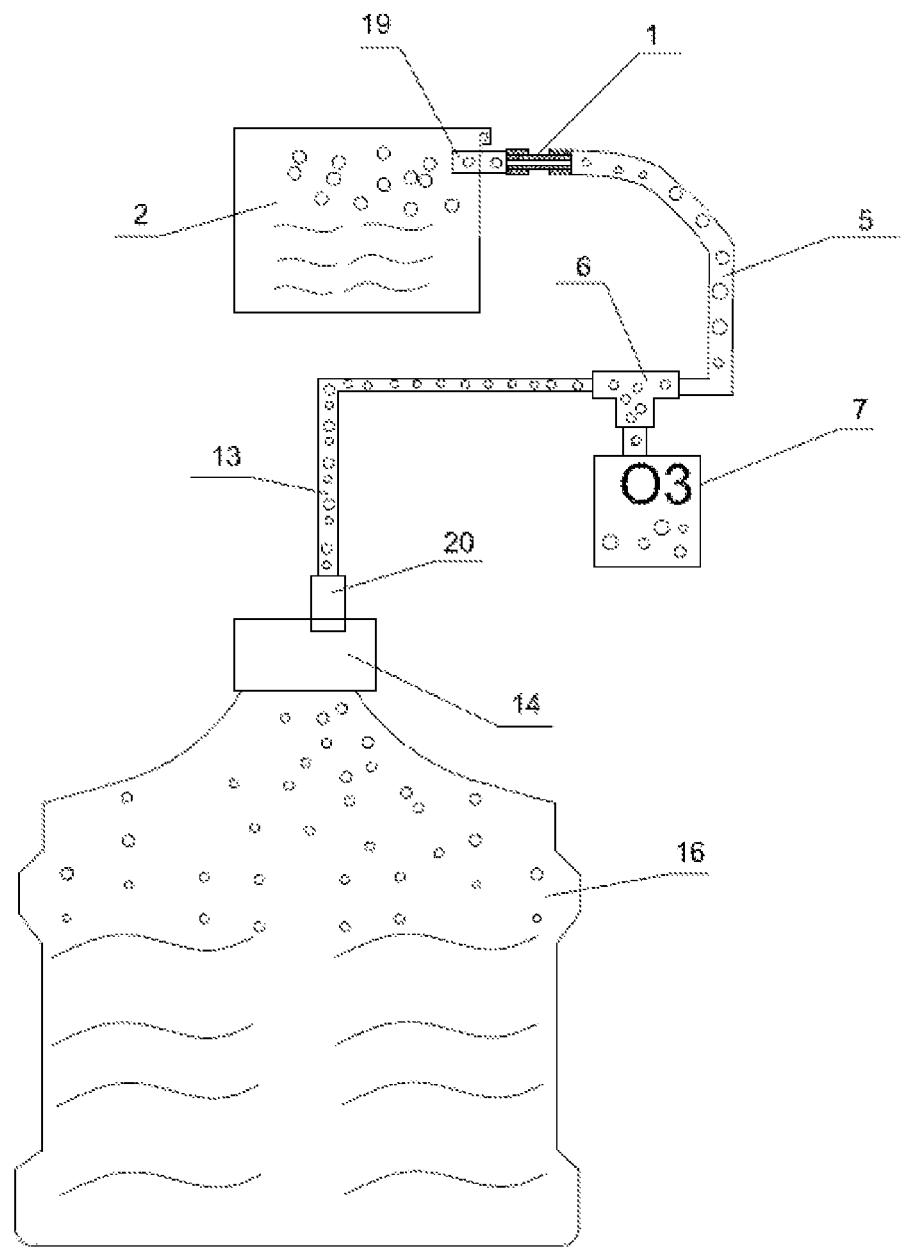
FIG. 2: A cross-sectional, side view of the ozone generator, Y-connector, capillary tube, cold tank, and water bottle shown in the water dispenser of FIG. 1.

When the dispenser includes a hot tank 10, the invention provides that the transfer of steam from the hot tank 10 to the cold tank 2 through tube 3 (as described above) will cause the upper portion of the cold tank 2 to become moist and warm, thereby creating an ideal environment for bacterial growth. When ozone gas is injected within the water of the cold tank 2, as shown in the embodiments of FIGS. 3 and 4, such ozone may not only be ineffective to sanitize the water itself (since only a small amount of water contacts the ozone gas), it may also be ineffective to thoroughly sanitize the bacteria that may colonize in the moist and warm upper portion of the cold tank 2 (near the outlet of tube 3). Increasing the amount of ozone gas that is injected under the water may not provide an ideal solution, insofar as excessive ozone gas may adversely impact the taste of the water (and could result in undesirable emissions of ozone gas into nearby ambient air). Accordingly, the invention provides that, in the preferred embodiment, and particularly for those dispensers that include a hot tank 10, bacterial growth is more efficiently and safely combatted by dispensing ozone gas directly above the water in the cold tank 2 (as shown in FIGS. 1 and 2).

In addition, according to certain embodiments (and particularly those shown in FIGS. 1 and 2), the cold tank 2 may comprise one or more water level sensors 50, which are configured to detect and monitor the water level in the cold tank 2. The invention provides that water level information/data will be reported to the control board within the dispenser. The invention provides that the control board is configured to activate and deactivate the water pump 12. More specifically, as water exits the cold tank 2 (e.g., when a user dispenses cold drinking water from the dispenser faucet), the water level may dip below a defined threshold, which is detected and communicated by the water level sensors 50 to the control board. At that time, the control board will instruct the water pump 12 to activate, to extract and deliver water from the water bottle 16 to the cold tank 2 (to back-fill the water that exited the cold tank 2), until the water level reaches a defined maximum threshold. Importantly, in the embodiments shown in FIGS. 1 and 2, the defined maximum threshold for the cold tank 2 water level will be below the terminal end of tube 5. This is important to prevent water from exiting the cold tank 2 through tube 5 (and causing damage to the ozone generator 7).

The many aspects and benefits of the invention are apparent from the detailed description, and thus, it is intended for the following claims to cover all such aspects and benefits of the invention which fall within the scope and spirit of the invention. In addition, because numerous modifications and variations will be obvious and readily occur to those skilled in the art, the claims should not be construed to limit the invention to the exact construction and operation illustrated and described herein. Accordingly, all suitable modifications and equivalents should be understood to fall within the scope of the invention as claimed herein.

What is claimed is:

1. A bottled water dispenser, which comprises:
    (a) a water bottle positioned within a bottom half of the dispenser;
    (b) a cold tank;
    (c) an ozone generator that is fluidly coupled to a Y-connector, wherein the Y-connector includes a first port and a second port;
    (d) a first tube that is fluidly coupled to the first port of the Y-connector that is configured to deliver ozone gas produced by the ozone generator to the cold tank; and (e) a second tube that is fluidly coupled to the second port of the Y-connector that is configured to deliver ozone gas produced by the ozone generator to the water bottle, wherein the ozone gas is effective to sterilize and prevent biofilm formation within (i) an interior space within the cold tank located above a volume of water and (ii) an interior space within the water bottle located above a volume of water, wherein the bottled water dispenser further comprises an in-line flow restrictor positioned in-line with the first tube or second tube, wherein (x) the in-line flow restrictor is positioned in-line with the first tube, if the first tube is shorter than the second tube; (y) the in-line flow restrictor is positioned in-line with the second tube, if the second tube is shorter than the first tube; and (z) the in-line flow restrictor is configured to be adjustable and capable of modulating an amount of flow resistance imparted by the in-line flow restrictor.

2. The bottled water dispenser of claim 1, wherein the in-line flow restrictor is positioned in-line with the first tube.

3. The bottled water dispenser of claim 2, wherein (a) the first tube terminates above the volume of water in the cold tank; and (b) the second tube terminates above the volume of water in the water bottle.

4. The bottled water dispenser of claim 3, which further comprises a water level sensor positioned within the cold tank that is configured to communicate water level information to a control board, wherein the control board is configured to (a) activate and deactivate a water pump that extracts and delivers water from the water bottle to the cold tank and (b) maintain a water level within the cold tank below a point at which the first tube terminates and deposits ozone gas therein.

5. The bottled water dispenser of claim 4, wherein the ozone generator dispenses ozone into the cold tank and water bottle at defined time intervals.

6. The bottled water dispenser of claim 2, wherein (a) the first tube terminates within the volume of water in the cold tank; and (b) the second tube terminates within the volume of water in the water bottle.

7. The bottled water dispenser of claim 6, wherein the first tube and second tube each comprise an ozone diffuser located at a terminal end of each such tube.

8. The bottled water dispenser of claim 7, wherein the ozone diffuser is comprised of porous stone or porous sintered metal.

9. The bottled water dispenser of claim 8, wherein the ozone generator dispenses ozone into the cold tank and water bottle at defined time intervals.

* * * * *